United States Patent [19]

Williams, III

[11] Patent Number: 4,744,856

[45] Date of Patent: May 17, 1988

[54] DEVICE FOR PRODUCING PAPER FROM WHICH A BAG HAVING A WATERPROOF, LEAKPROOF BOTTOM MAY BE FABRICATED, AND METHOD FOR PRODUCING SAID BAG

[76] Inventor: Joseph I. Williams, III, 701 Pitt St., Mt. Pleasant, S.C. 29464

[21] Appl. No.: 919,754

[22] Filed: Oct. 16, 1986

[51] Int. Cl.⁴ .................. B32B 31/00; B31B 39/02
[52] U.S. Cl. .................. 156/519; 156/552; 156/256; 493/217; 493/345; 493/933
[58] Field of Search ............ 156/517, 519, 552, 256; 493/345, 380, 933, 217, 218, 219, 220, 224; 383/113, 114

[56] References Cited

U.S. PATENT DOCUMENTS

| | | | |
|---|---|---|---|
| 893,759 | 7/1908 | Thomas | 383/113 |
| 2,257,823 | 10/1941 | Stokes | 493/217 |
| 3,212,697 | 10/1965 | Anderson | 383/113 |
| 3,259,301 | 7/1966 | Onasch | 493/217 |
| 3,358,903 | 12/1967 | De Stefano et al. | 383/113 |
| 3,540,356 | 11/1970 | Lecomte | 493/217 |
| 3,927,606 | 12/1975 | Brockmuller et al. | 493/218 |
| 4,196,035 | 4/1980 | Reil | 156/552 |
| 4,353,770 | 10/1982 | Kuckhermann | 493/217 |
| 4,549,729 | 10/1985 | Hoffstetter et al. | 156/552 |
| 4,608,115 | 8/1986 | Schroth et al. | 156/519 |

FOREIGN PATENT DOCUMENTS 888099 1/1962 United Kingdom ............... 156/519

Primary Examiner—Frederick R. Schmidt
Assistant Examiner—William E. Terrell
Attorney, Agent, or Firm—B. Craig Killough

[57] ABSTRACT

A device is disclosed herein which will apply strips of plastic to paper, such as kraft paper, transversely to the travel of such paper as it is fed from a roll. The resulting paper may then be formed into a bag by machinery commonly in use in the industry, without modification, with the resultant bag having a leakproof, waterproof bottom.

4 Claims, 2 Drawing Sheets

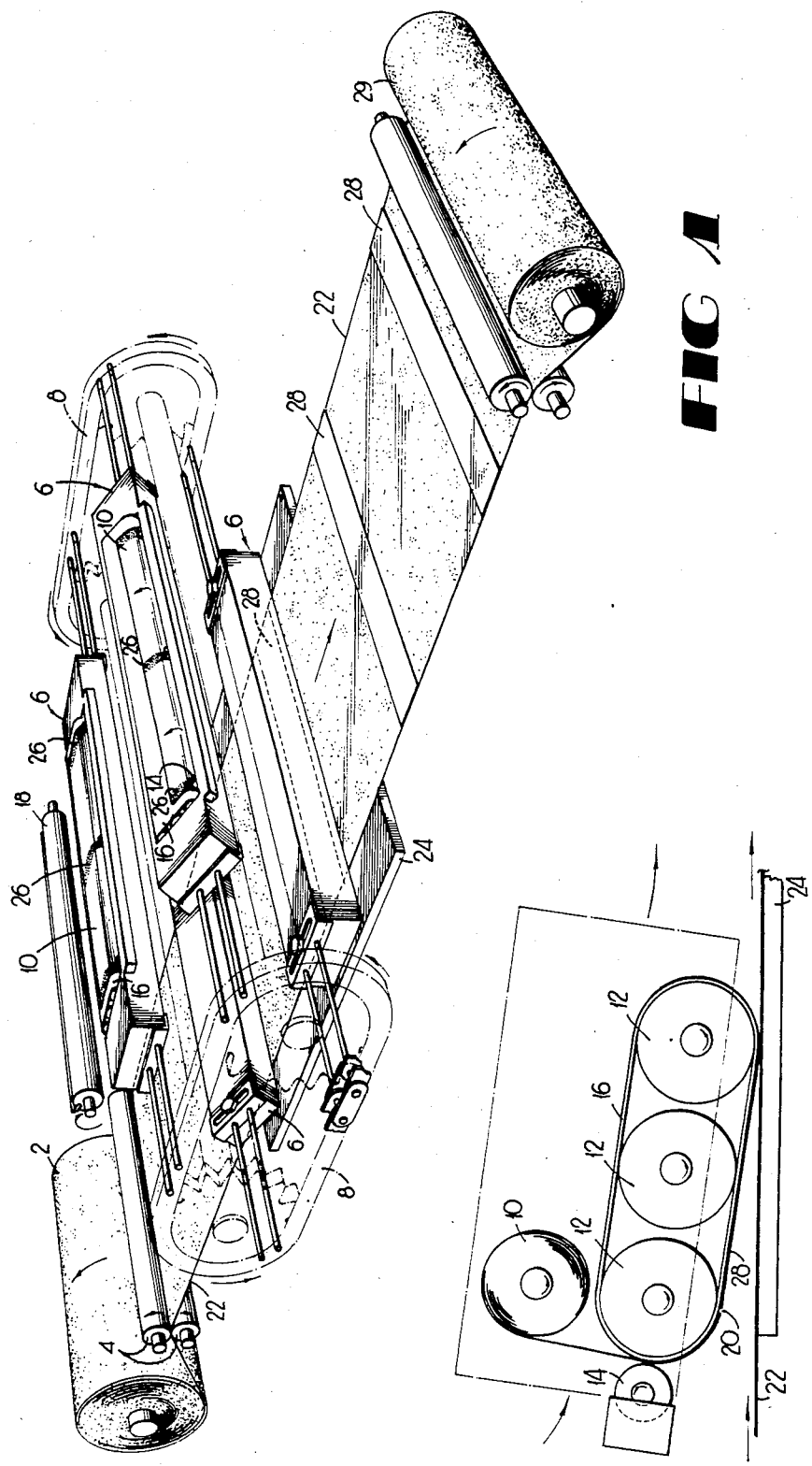

DEVICE FOR PRODUCING PAPER FROM WHICH A BAG HAVING A WATERPROOF, LEAKPROOF BOTTOM MAY BE FABRICATED, AND METHOD FOR PRODUCING SAID BAG

BACKGROUND OF THE INVENTION

This invention relates to producing paper from which a bag may be made, having a waterproof, leakproof bottom. The paper is produced by affixing a waterproof material, such as plastic, to a portion of the bag material during the manufacturing process.

Paper bags have various and multitudinous uses, including the transporting of liquids and frozen substances which have the potential to become liquids at room temperature. Most commonly, paper bags are used to transport liquids and frozen foods from the checkout counters at grocery stores to home, and are used to transport liquids, such as soft drinks, placed in paper cups from take-out restaurants, particularly from fast food restaurants.

A common problem is the absorbency and leaking characteristics of the common paper bag. Cups containing drinks purchased from take-out restraurants leak, causing the liquid to spill into the bag, and subsequently leak through the bag, causing the liquid to subsequently spill onto cars, clothing or furniture. Meats or other groceries containing liquids, or frozen floods which begin to melt while being transported in a paper bag leak through the paper bag causing similar problems.

Until the present invention, there has not been an economical and efficient way to produce a paper bag having a bottom which is leakproof. Paper bags are inexpensive in comparison to a bag which is made of plastic, and have certain shape retention characteristics which are desirable. A device and method are disclosed herein which will produce paper from which a paper bag having a bottom which is leakproof may be made, allowing most of the bag to be made of paper, such as kraft paper, for economy and shape, while producing a bag having the desired characteristics of plastics at a lesser cost of production.

Paper bags, as commonly produced, begin from a large roll of paper such as kraft paper. Paper is fed from the roll, and slit parallel to the direction of travel of the sheet of paper as it is fed from the roll. The paper is then rolled into a continuous cylinder, glued along a seam, and cut again perpendicular to the length of the paper cylinder so as to produce a section of paper having the desired width and length for the resultant paper bag. The sides are creased and folded, and one end of the tube or cylinder is then closed by folding and gluing so as to produce the bottom, and a paper bag is created.

The present invention incorporates the well known method of producing a paper bag. The present invention improves the prior method by feeding a strip of waterproof material, such as polypropylene, through an adhesive substance, and affixing the strip of polypropylene to the roll of paper from which bags are to be produced. The width of the strip is such that the entire bottom of the bag after it is folded will be covered by the waterproof material, and further, a small portion of the side of the bag adjacent to the bottom will be covered with the waterproof material.

SUMMARY OF THE PRESENT INVENTION

Disclosed herein is a device which will apply plastic strips to paper such as common kraft paper from which paper bags are made, with the strips being applied perpendicularly to the travel of the paper as it is removed from a roll, so that the paper may in turn be used to produce a bag having a plastic, waterproof and leakproof bottom from the paper, by the means and machinery which is presently and most commonly used in the paper bag industry to produce bags from rolls of kraft paper.

FIG. 1 shows a common roll of kraft paper 2, from which the sheet of kraft paper 27 is being unrolled and fed into the device. Applicators 6 which are located on a conveyor means intermittently apply a strip of plastic 28 to the kraft paper perpendicular to the direction of travel of the paper, at the desired intervals. These applicators travel on their conveyor means at a rate of speed which is equal to the rate of feed of the kraft paper. Kraft paper to which strips of plastic have been applied is then again rolled, or may be fed directly into a bag making device.

Each applicator contains a roll of plastic material 10 and its own conveyor means. As the applicator rotates to the top of its conveyor, the plastic material 10 is fed by the drive means to the exterior of the applicator and is cut by a cutter. As the applicator continues to rotate, it engages the paper, and the plastic is deposited on the kraft paper and held in place by the glue.

The significance of the invention is that the strips of plastic are applied transversely, or perpendicularly, to the travel of the paper. While it would be simpler to apply the strips parallel to the travel of the paper, the resulting paper so produced could not be used with the paper bag making machinery currently in use in the industry to achieve the desired product.

DETAILED DESCRIPTION OF THE DRAWINGS

FIG. 1 shows a perspective view of the device.

FIG. 2 shows an isolated, action, side elevation of the applicator as it engages the kraft paper traveling through the device.

DETAILED DESCRIPTION OF THE PREFERRED EMBODIMENT

Figure 3:
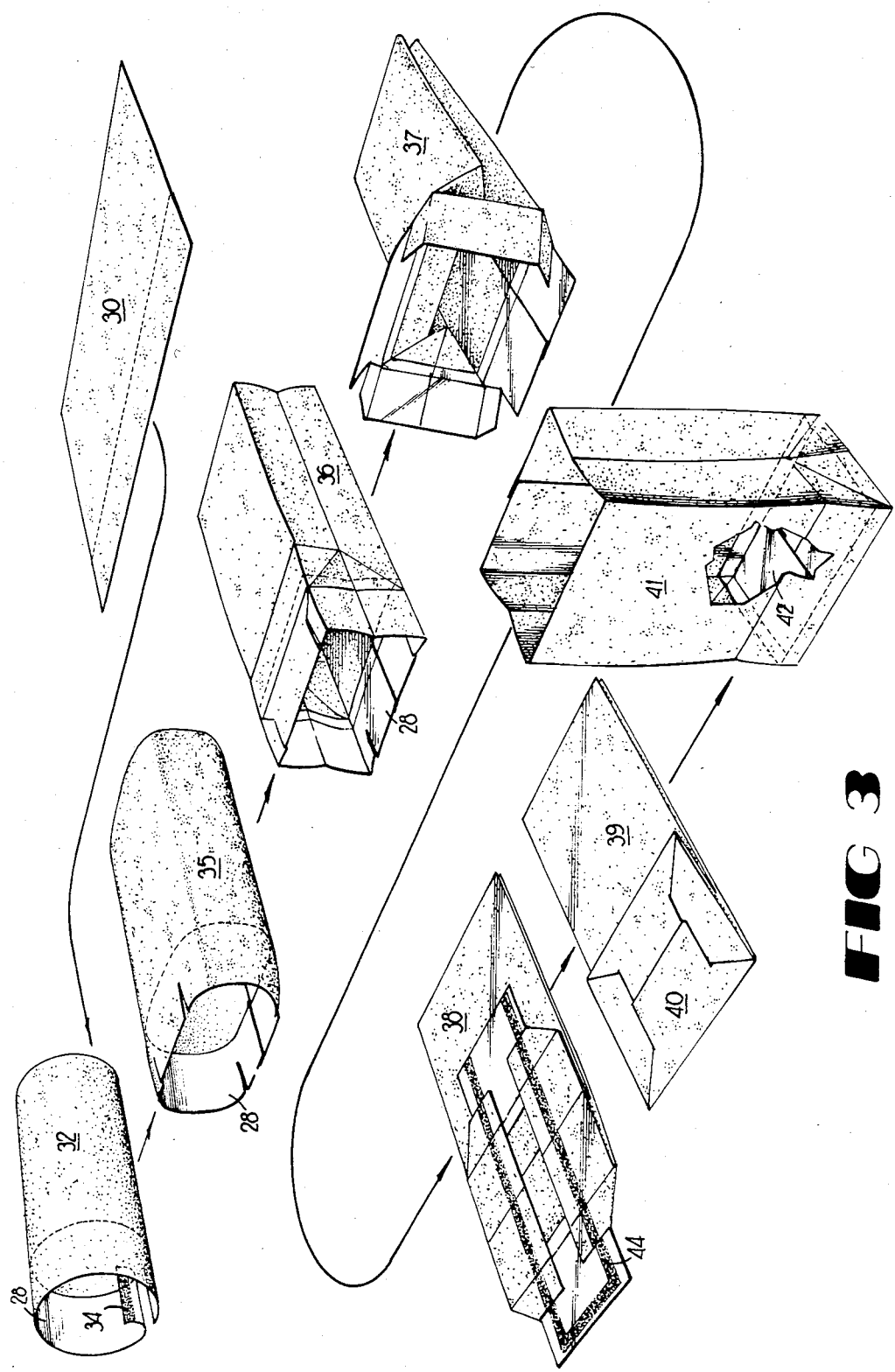
FIG. 3 shows the sequences of the formation of a paper bag as it is commonly formed and produced by the common method, additionally incorporating the plastic strip applied by the device shown in FIG. 1 so as to produce a paper bag having a leakproof, waterproof bottom.

Kraft paper 2 of the type commonly used to make paper bags, or any other material from which a bag could be made, is fed from a roll by power means, and is fed through rollers 4 so as to align the paper. The paper 2 continues to pass through the device as shown in FIG. 1.

The invention itself comprises a series of applicators 6 which travel in a continuous loop by a conveyor 8 means. This conveyor 8 means may be powered by any commonly known means, including an electric motor, and as shown, may incorporate four drive sprockets which are used to drive the applicators 6 in a continuous loop. The particular drive means could be any known means which would convey the applicators in the manner which is shown herein.

Within the applicators 6 themselves is a roll of plastic material 10. The plastic material 10 itself may be polypropylene or any other waterproof material which may be glued to paper. The width of the roll of plastic material 10 is equal to the width of the roll of kraft paper 2. The roll of plastic material 10 is fed onto a drive means 12 within the applicator 6. At various intervals along the sheet of plastic material 10, a multiplicity of glue applicators 14 apply glue to the plastic. Three of such glue applicators 14 could be used in each applicator 6. The glue applicators may be wheel type applicators as shown.

The applicators 6 travel on their conveyor 8 at a velocity equal to the velocity of the kraft paper 2 as it is fed from the roll. The applicators 6 travel in a continuous loop on their conveyor 8, and cycle one time for each revolution. The applicator cycle begins with the plastic being fed onto the outboard portion 16 of the applicator drive means 12. The applicator drive means 12 may comprise two or more wheels which in turn drive a belt which contacts a portion of plastic material from the roll of plastic material 10 so as to feed the portion of plastic material for the application of glue and so that the plastic 28 may be affixed to the kraft paper 22. This feeding process takes place as the applicator comes to the upper part of its rotation on the conveyor. The plastic is fed from the roll until it covers the flat, outboard portion 16 of the drive means 12, and is fed no further. This feeding of the plastic from the roll onto the outboard portion of the drive means is completed by the time the applicator starts downward. As the applicator 6 starts downward, and just before it engages the paper, the plastic strip is cut by a cutter 18, so as to create a strip of plastic which may be applied to the paper. This cut may be seen at 20. A hot wire or other means could be used to cut the plastic into strips. The cutter could be located within the applicator.

As the applicator 6 continues its rotation, it engages the sheet 22 of kraft paper which is being fed from the roll. The combination of the weight of the applicator against the table 24 and the glue 26 which has been applied to the strip of plastic 28 causes the plastic to adhere to the kraft paper. The applicator 6 is moving at a velocity on its conveyor equal to the velocity of the kraft paper 22 and follows the kraft paper along until the applicator is taken back up by the conveyor means. The strip of plastic 28 remains on the sheet of kraft paper 22, and is perpendicular to the direction of travel of the kraft paper. As the applicator starts upward, a timing device, which could be any common timing means, whether mechanical, electrical, or electromechanical, causes the roll of plastic material 10 to again be fed by the drive means 12 located within the applicator, and the cycle begins again.

After the strips of plastic 28 have been applied to the kraft paper 22, the processed kraft paper may either be directly fed into a paper bag making machine, or may be rolled again 29 for storage and later use.

Paper bags which have a waterproof and leakproof bottom may then be made from the processed kraft paper, with the formation of the paper bag shown in FIG. 3. Commonly used paper bag making equipment existing in the prior art may now produce the desired bag.

Kraft paper 30 is fed from its roll and, if desired to achieve a paper bag of a certain size, may be slit parallel to the direction of travel of the kraft paper. The kraft paper is then rolled into a continuous cylindrical or tubular shape 32, and glued along a seal 34. This cylinder or tube is then cut perpendicularly to its height, and folded as seen in steps 35, 36, 37, 38, 39, 41, with one end of the bag being folded and glued 44 so as to form a bottom 40. These are the same steps used in the industry at present to make paper bags, with these steps performed by automated equipment.

By incorporating the paper which is produced by the device described herein, the resultant bag has a bottom which is leakproof and waterproof due to the strip of plastic 42 which has been applied by the device herein, and as shown in FIG. 3. The plastic bottom in the bag of FIG. 3 is shown as a phantom, and can more clearly be seen in the cutaway portion of the bag as shown in the drawing.

The applicators 6 will apply the strips 28 at intervals on the paper 22 according to their spacing on the conveyor 8. It is anticipated that the number of applicators on the conveyor may be increased or decreased as desired, with their spacing accordingly adjusted so as to produce the strips at various intervals for bags of varying sizes as desired.

What is claimed is:

1. A device for producing paper having strips of plastic affixed transversely thereto at uniform intervals, comprising means for feeding a web of paper along a path, a continuous conveyor means overlying the path having a multiplicity of applicator means conveyed by said conveyor means, and wherein each of said multiplicity of applicator means contacts said paper at a uniform interval, or as to apply a strip of plastic fed from each of said multiplicity of applicator means transversely to said paper at a uniform interval, wherein each of said multiplicity of applicator means comprises:
    (a) a roll of plastic material contained within each of said multiplicity of applicators;
    (b) a drive means contained within each of said multiplicity of applicator means for intermittently and cyclically feeding a portion of plastic material from said roll of plastic material contained within each of said multiplicity of applicator means; and
    (c) one or more means for applying glue to a surface of said portion of plastic material as said portion of plastic material is fed from said roll of plastic material.

2. A device for producing paper having strips of plastic affixed transversely thereto at uniform intervals as described in claim 1, further comprising a means for cutting said portion of plastic material after said portion of plastic material has been fed from said roll of plastic material.

3. A device for producing paper having strips of plastic affixed transversely thereto at uniform intervals as described in claim 1, wherein said drive means comprises:
    (a) two or more drive wheels; and
    (b) a belt which is driven by said drive wheels and which contacts said portion of plastic material so as to feed said portion of plastic material from said roll of plastic material to an outboard portion of the applicator means.

4. A device for producing paper having strips of plastic transversely affixed thereto at uniform intervals as described in claim 3, further comprising a means for cutting said portion of plastic material after said portion of plastic material has been fed from said roll of plastic material to said outboard portion of the applicator means.

* * * * *